Nov. 6, 1962

G. D. P. DE DOBBELEER 3,061,936

STEREOTAXICAL METHODS AND APPARATUS

Filed July 8, 1959

Inventor:
GILBERT D. P. DE DOBBELEER

Inventor:
GILBERT D. P. DE DOBBELEER

Nov. 6, 1962   G. D. P. DE DOBBELEER   3,061,936
STEREOTAXICAL METHODS AND APPARATUS
Filed July 8, 1959   5 Sheets-Sheet 3

Inventor:

GILBERT D.P. DE DOBBELEER

Nov. 6, 1962  G. D. P. DE DOBBELEER  3,061,936
STEREOTAXICAL METHODS AND APPARATUS
Filed July 8, 1959  5 Sheets-Sheet 4

INVENTOR
Gilbert Désiré Philomena De Dobbeleer

BY *Hugo E. Weisberger*
ATTORNEY

Nov. 6, 1962 G. D. P. DE DOBBELEER 3,061,936
STEREOTAXICAL METHODS AND APPARATUS
Filed July 8, 1959 5 Sheets-Sheet 5

INVENTOR
Gilbert Désiré Philomena DeDobbeleer

BY *Hugo E. Weisberger*
ATTORNEY 3,061,936
STEREOTAXICAL METHODS AND APPARATUS
Gilbert Désiré Philomena De Dobbeleer, Terbank-Heverlee, Belgium, assignor to Universite de Louvain, Louvain, Belgium
Filed July 8, 1959, Ser. No. 825,684
Claims priority, application Belgium Mar. 7, 1959
7 Claims. (Cl. 33—174)

This invention relates to a new method and a new apparatus of stereotaxy.

The invention has for its object to allow of reaching with a surgical instrument any point in the human brain with a margin of at the most 0.5 mm., and to perform the various surgical operations in one sitting. Moreover, the invention allows of locating the point to be reached by means of an easy reading and exact and easy calculations of coordinates in such a manner that the insertion of the surgical instrument can be effected at any point of incidence upon the skull, and of maintaining the head of the patient in a fixed position, without any incisions or surgical trapanning being performed.

The invention consists in providing a frame serving as a support for the skull, movable around three axes which are perpendicular in space to one another, thus permitting to establish by calculation the coordinates of any point of the brain of the person which is subjected to a stereotaxical operation.

According to another characteristic feature of the invention, a graduated reference frame is provided, which is fixed in a direction parallel to the axial plane of the skull, which frame is to be placed in the plane of the reference members situated inside the skull, relatively to which the position of the point to be found is known.

A second graduated and pivoted frame serves both as a reference member and as a guiding support for the surgical instrument, its articulation permitting its partial rotation around a horizontal axis defined by reference marks given by the first frame.

The guiding of the surgical instrument may be effected by means of a circular support fixed upon the rotary part of the second frame.

The centre of curvature of the circular support is situated on its axis of rotation.

The centre of curvature may be displaced upon the axis of rotation by a cross-adjustment of the circular support.

An actuating and controlling switchboard comprising an electro-cardiotachymeter, a negatoscope of variable intensity, a unit commanding the X-rays apparatus, and an analogical calculating machine, allow of calculating the coordinates of the point to be reached.

The invention is illustrated diagrammatically and by way of example in the accompanying drawings, in which.

Figure 1:
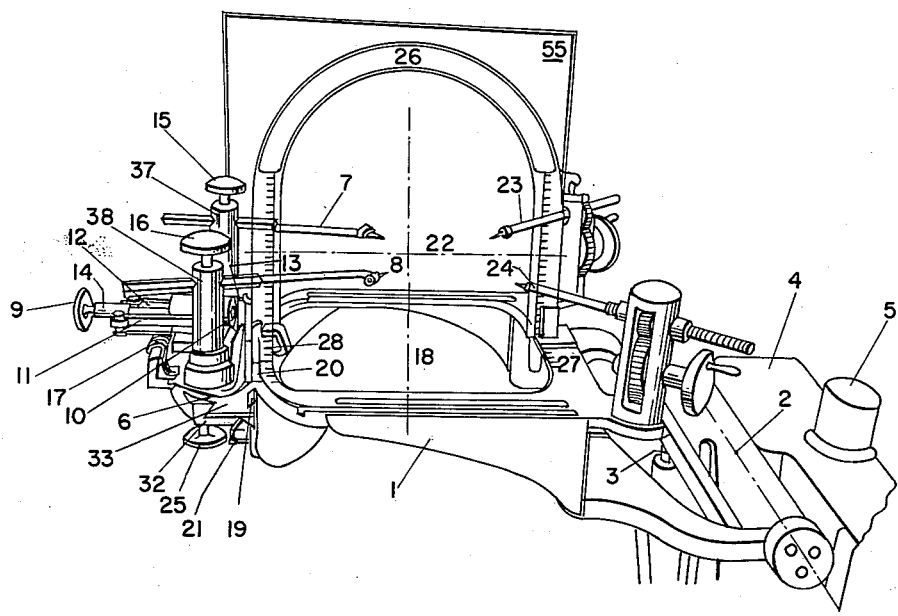
FIGURE 1 shows a perspective side view of the headgear hereinafter mentioned.

Referring to the drawings, a base frame is shown by the reference numeral 1. The frame 1 can rotate around an axis 2 and its rotation is regulated by a stop screw 3. An adjustment in the direction of the height can be effected by a vertical translation movement of the axis 2. Such a translation movement is guided by two vertical columns, not shown, which are mounted on the base of the apparatus. The adjustment along the direction of the height is effected by means of a ratchet wheel arrangement, part of which has been shown at 5. A support member 6 fixed on the base, allows of simultaneously effecting a first fixation and a rotation of the head around two axes which are perpendicular to one another and perpendicular to the axis of rotation of the base frame.

The fitting 6 allows the head of the patient to be fixed.

The two pointed members 7 and 8 are mounted upon two pivoting columns 37 and 38. The two columns are connected with a set screw 9 by means of two levers 10 and 11 on the one side, and 12 and 13 on the other side. The levers 12 and 13 which are fixed to the nut 14 follow the nut according to the movement of the screw 9 and bring the pointed ends nearer to one another or move them away from each other. The pointed ends allow therefore a first fixation to be effected; moreover, it is possible by means of two set screws 15 and 16 to adjust the position of the pointed ends 7 and 8.

The two pivoting columns are mounted upon the member 6. The latter member 6 is mounted upon a support member 32 by means of a circular dovetail 33. Thanks to a screw 17 it is possible to fit the member 6 into the member 32 in such a manner that the member 6 shall describe a circle, the centre of which is formed by a point situated upon a line 18 passing approximately through the centre of the head of the person subjected to stereotaxy and is perpendicular to the axis of rotation 2 of the base frame.

Thus, the movement produced by a rotation of the screw 17 allows of effecting an adjustment of the head around a vertical axis, the latter axis being at the same time perpendicular to the axis 2. A member 32 also carries a cylindrical dovetail 19, which dovetail 19 engages a corresponding cylindrical dovetail of a member 20 fixed to the base frame.

By means of a nut 21 it is possible to pivot the member 32 relatively to the member 20 around an axis 22 approximately situated at the centre of the head, which axis 22 however is horizontal. The axis 22 is perpendicular to the first axis 18 and is at the same time perpendicular to the axis 2 of the base frame.

Three adjustments of the head of the person are thus available at that moment, either around an axis 2, and around an axis 18 and around the axis 22. The three axes are perpendicular in space to one another, thus permitting a precise location in space to be effected.

Once the head is fixed and adjusted by means of the block 6 and of the pointed ends 7 and 8, it is possible finally to fix the head by means of the pointed ends 23 and 24 which hold the head in its final position. It should be pointed out that from that moment no adjustment with the tangent screws 17 and 21 is effected. Two set screws are provided, one of which alone, 25, has been shown.

Figure 5:
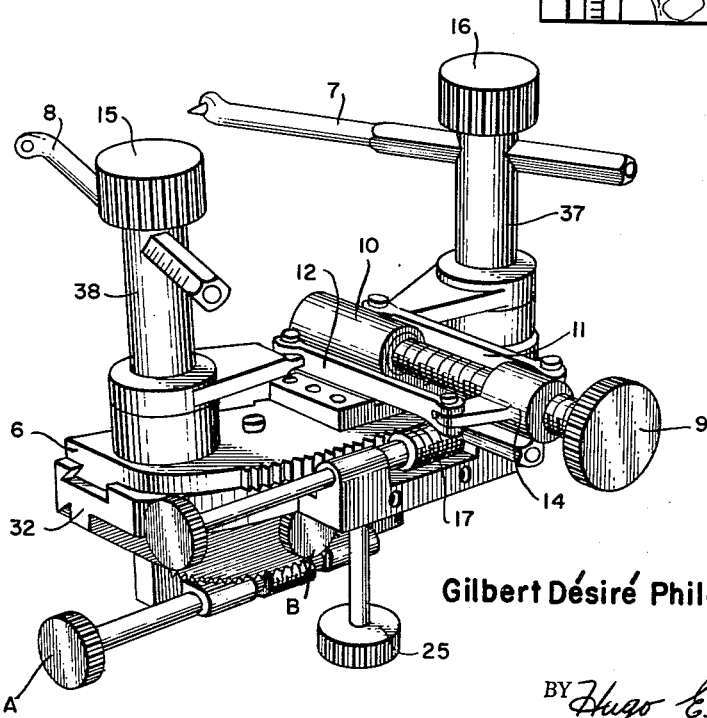
FIGURES 5 to 8 are perspecitve views showing some of the structural features in detail.

FIGURES 5 to 8 show in greater detail the above-described structural features of the present invention. Thus, FIGURE 5 illustrates the support member 6 which serves as a base for the fixation system comprising the two pivoting columns 37 and 38 carrying the pointed ends 7 and 8 with the set screws 16 and 15. The columns 37 and 38 are carried by the levers 11 and 12 through the intermediary of the nut 14 which is driven by the set screw 9. Thus, the pointed ends 7 and 8 may be held in their set positions and, in turn, hold the head of the patient in place. The support member 6 slides in the circular dovetail cut of the support member 32. The movement is such that the axis of rotation of member 6 occurs about the vertical axis of the skull of the patient held by the ends 7 and 8, actual rotation being effected by means of the screw 17.

Figure 6:
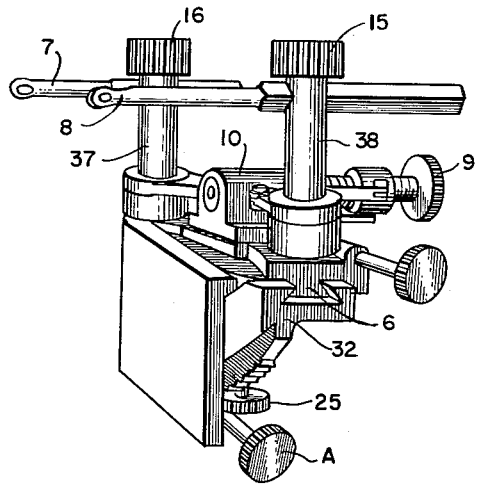

FIGURE 6 shows the shape of support member 32, the latter being rectangular and having the dovetail 6. The second, vertical dovetail allows the member 6 to be carried such that it can rotate about a horizontal axis which also passes through, from front to rear, through the patient's skull. A vertical plate carrying support member 32 is fixed upon the stereotaxical frame, and screw 1, shown in FIGURE 5, allows the support member 32 to be rotated about the horizontal axis.

Figure 7:
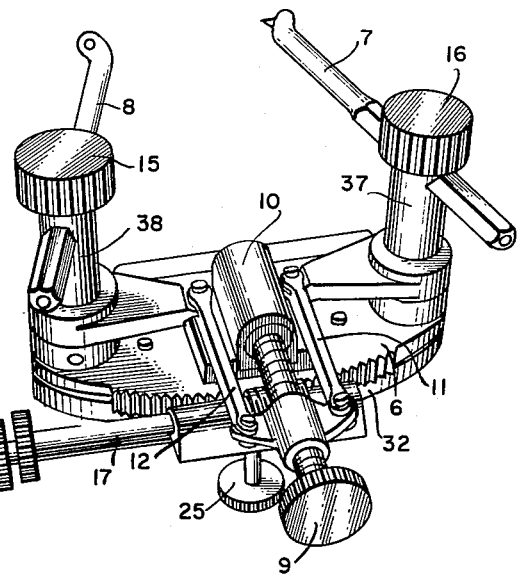
Figure 8:
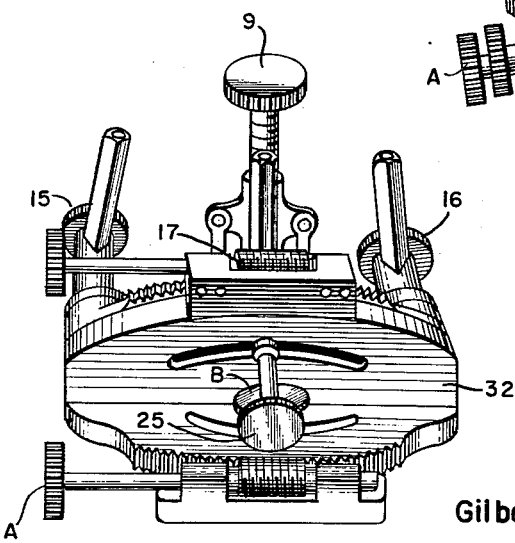

FIGURE 7 is a perspective view of the support and the fixation system, while FIGURE 8 is a view of the member 32 as seen from below at an angle of 45°. The two illustrated grooves serve for fixation when the proper position has been attained. Finally, the screw B, shown in FIGURE 5, prevents rotation about the above-mentioned horizontal axis extending from front to rear.

A first graduated locating frame is provided to be fixed in a direction parallel to the axial plane of the skull. The frame 26 is made easily adjustable in a vertical plane, parallel to the axis 22. For that purpose, graduations 27 and 28 are provided upon the base frame, allowing a very simple parallel guiding to be effected.

A second frame 34 is provided which is graduated and articulated, serving both as a locating member and as guiding support for the surgical instrument. Its articulation permits a partial rotation to be effected around a horizontal axis defined by the reference marks supplied by the first frame. The guiding of the surgical instrument is effected by means of a circular support, fixed upon the rotary part of the second frame.

Figure 2:
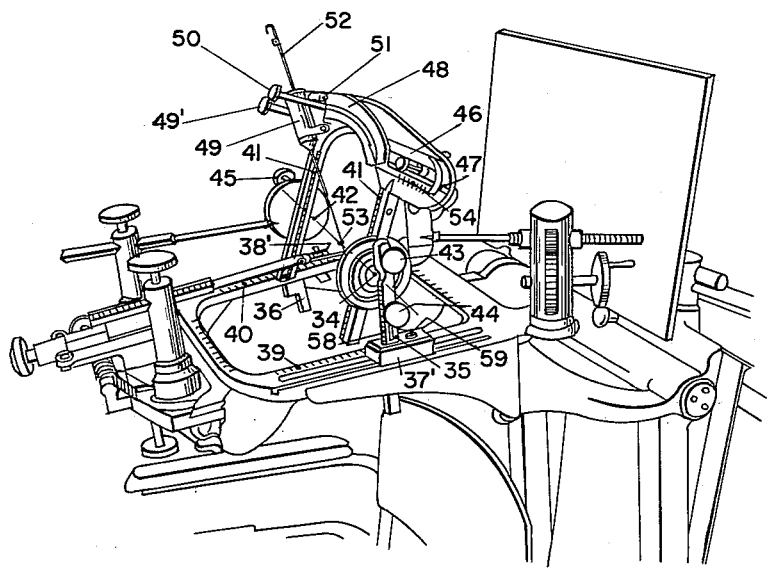
FIGURE 2 is a view from above of the same device.

The second frame is shown in FIGURE 2 at 34. It shows two legs made of vertical sliding members 35 and 36 and two guiding supports 37' and 38'. The two guiding supports slide longitudinally upon the base frame 1 and are adjusted by means of graduations 39 and 40. The second part of the frame, that is the movable part, which contains at the same time the lead graduations 41, is articulated on the two base members around the axis 42. The movable piece is fixed to the two fixed legs 35 and 36 by means of screws 43, 44, 45.

Owing to the fact that the member 34 is hinged relatively to the legs, it is always possible to adjust it in such a manner that it shall be parallel to the radiography which is being taken. This is important for always obtaining good pictures.

A support 46 has been placed on the upper portion of the member 34, sliding in a groove 47 which is parallel to the axis of rotation 42. The central part of the support 46 consists of a circular support 48, which is built in such a manner that its centre of curvature shall fall exactly upon the axis of rotation 42.

The guiding support 49, which slides upon the support 48 serving for guiding the drilling tool in the trepanning operation and the surgical tool, allows therefore of displacing the said tools upon the support 48 and allows at the same time of fixing it by means of screws 49' and 50.

The slope of the guiding member 49 is such that the axis of the tool or of the cylinder comes back upon the axis 42, therefore in the centre of curvature of the circular support.

Such a construction allows of placing a support 51 forming the base of the guiding support 49, upon the entire length of the support 48, without influencing in any way the final point of the axis 52 of the guiding cylinder. The intersection point 53 of the axis 52 with the axis 42 is always the same.

It is possible to displace the support 46 in the groove 47. The intersection point 53 moves upon the axis of rotation 42 and namely along a distance which is known by the graduations marked upon the members 46 and 47, which graduations are given at 54.

When the member 34 is pivoted around the axis 42, the position of the point of intersection 53 does not change; the said member always returns in the axis of rotation, which has been once for all defined relatively to the member 34. The guiding member 49 can therefore describe a large sector of a sphere without influencing the point of intersection 53.

Figure 3:
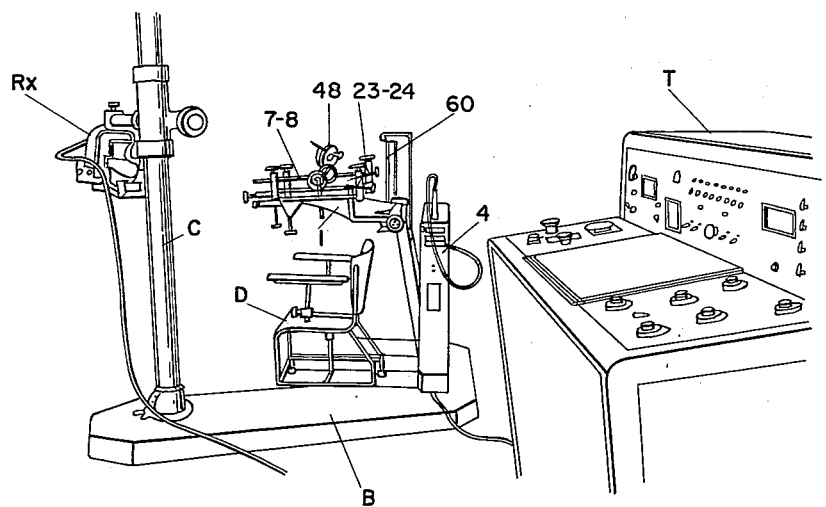
FIGURE 3 is a general view showing the headgear with its support, a seat for the person subjected to the test, a support of the X-rays apparatus and the switchboard.

In FIGURE 3, B is the frame, C is the column for supporting the X-rays apparatus, Rx is the X-rays apparatus, D is a chair upon which the person subjected to stereotaxy is seated, T is the electronic actuating and controlling switchboard comprising an electro-cardiotachymeter, a negatoscope of variable intensity, a unit for actuating the X-rays apparatus and an analogical calculating machine permitting to calculate the coordinates of the point of the brain to be reached.

*Mode of Operation*

Figure 4:
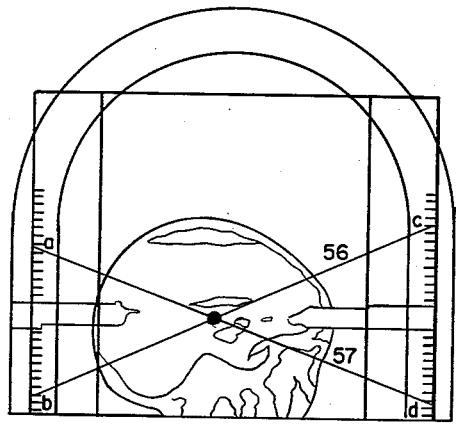
FIGURES 4 and 4a show two perpendicular radiographies, the use of which will be explained hereinafter.

Reference will now be made to FIG. 1 for explaining the mode of working of the apparatus. Let us suppose that the head of the patient has been fixed by means of the pointed members 7 and 8, then adjusted by means of the device 6, and then finally fixed by means of the pointed members 23 and 24. The arc or frame 26 is placed in the plane of the reference members in a direction parallel to the median plane. The box 55 containing the radiographic films is then placed in the position shown in FIGURE 1. The focus of the X-rays lamps is set upon a horizontal line passing through the point to be examined, which line is at the same time perpendicular to the axes 22 and 18. The distance from the plane of the arc 26 to the focus is of about one metre. If a radiography is taken in that position, it will be as shown in FIGURE 4. The point to be examined is marked upon the radiography.

In order to define the coordinates of that point relatively to the graduations which have been radiographed, two lines 56 and 57 are drawn, giving four readings at the points of intersection with the graduated scales, and which will be called A, B, C and D. The four quantities are introduced in the analogical calculating machine and the operation gives immediately the coordinates of the point to be examined.

The first of the values obtained allows of regulating the height of the legs of the second frame 34.

Figure 4A:
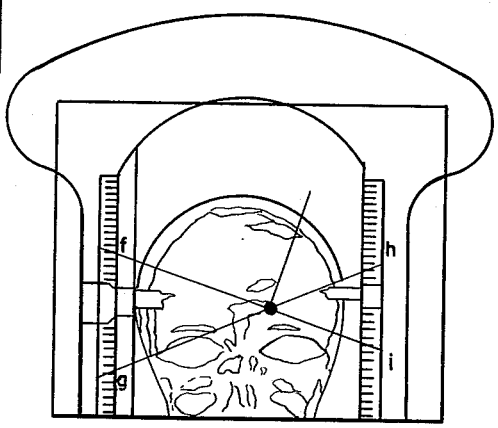

The height of the members 37 upon the legs 35 is regulated until the reading upon the graduated scale 58 has reached the value of one of the coordinates, which is given by the calculating table. That operation is effected for the legs 35 and 36. The frame 26 is removed, then replaced by the frame 34 which is therefore partially prepared by the adjustment of the height of the legs. The frame 34 is now longitudinally displaced in the two grooves, along the graduations 39 and 40, so as to obtain on the two graduations the value of the second coordinate which is given by the calculating table. At that moment, the frame 34 is finally fixed by means of the screws 59, the screws 44 and 43 are untightened on the one side, 45 and the screw not shown on the other hand, and the movable part of the frame is placed in a perpendicular position. A box containing a radiographic film is then placed in the position shown on FIGURE 2, then an X-ray lamp is placed on the horizontal line, passing through the point to be examined, which horizontal line is at the same time perpendicular to the plane of the movable part, to the axis 2 and to the radiographic film 60. That gives substantially the arrangement shown in FIGURE 3. A radiography taken in that position is shown in FIG-4a. Upon this radiography the point to be examined is again defined by the two graduated scales by drawing two lines as done for the radiography 4. The readings F, G, H and I allow of calculating by means of the electronic calculating machine the two coordinates of the point for that radiography. Owing to the fact that the chosen point is always upon the line of rotation of the frame 34, one of the coordinates will always be the same, and corresponds to the value given by the scale at the level of the axis of rotation.

The second reading of the switchboard will give the value upon which the scale 54 should be regulated in order to obtain that the centre of curvature of the cylindrical support 46 will return to the calculated point. If the said scale is applied to the reading obtained by the electronic table, the apparatus is ready for operation. From that moment, it is possible either to pivot the member 34 around its axis 42, or to slide the support 51 along the circular support 48; no influence whatever is exerted upon the final point of the probe, which will always return to the point shown upon the second radiography.

What I claim is:

1. A skull supporting device for holding the skull of a person subjected to stereotaxy, said device comprising, in combination:
   (a) a support;
   (b) a base frame defining a surface and being mounted on said support for pivotal movement relative thereto about a horizontal pivot axis, said base frame having a longitudinal axis lying in a plane which is at right angles to said pivot axis;
   (c) and a plurality of pointed members for holding the skull in position, said pointed members being mounted on said base frame for movement together relative thereto about said longitudinal axis of said frame as well as about an axis which is at right angles to said surface of said base frame.

2. A device as defined in claim 1, further comprising a graduated locating frame mounted on said base frame for pivotal movement relative thereto about a second pivot axis which is transverse to said base frame and in parallel spaced relationship therewith.

3. A device as defined in claim 2 wherein said locating frame is adjustable relative to said base frame in a direction which is at right angles to said base frame surface.

4. A device as defined in claim 3, further comprising a guide frame mounted on said locating frame and incorporating a circular portion for guiding surgical instruments.

5. A device as defined in claim 4 wherein the center of curvature of said circular portion is situated on said second pivot axis.

6. A device as defined in claim 5 wherein said guide frame is mounted on said located frame for movement relative thereto in a direction parallel to said second pivot axis, thereby allowing the center of curvature of said circular portion to be displaced along said second pivot axis.

7. A stereotaxy apparatus, comprising a device as defined in claim 5, and a switchboard containing means operatively associated with said device for calculating at a distance the coordinates of a point of the brain to be reached.

References Cited in the file of this patent

UNITED STATES PATENTS

| | | |
|---|---|---|
| 630,406 | Puffer | Aug. 8, 1899 |
| 870,506 | Gillet | Nov. 5, 1907 |
| 965,195 | Kelley | July 26, 1910 |
| 1,580,320 | Osborn | Apr. 13, 1926 |
| 2,441,538 | Steinhaus | May 11, 1948 |
| 2,450,875 | Braddon et al. | Oct. 12, 1948 |
| 2,651,725 | McFarland | Sept. 8, 1953 |
| 2,663,764 | Holmes | Dec. 22, 1953 |

FOREIGN PATENTS

| | | |
|---|---|---|
| 938,129 | France | Mar. 30, 1948 |
| 932,110 | Germany | Aug. 25, 1955 |